METHOD FOR IMPROVING SHARPNESS OF TELEVISION IMAGES

Filed Aug. 5, 1966 5 Sheets-Sheet 1

INVENTORS
HIROSHI IZUMI
TOSHIAKI KATAHIRA
MICHIO FURUHASHI

BY Wenderoth, Lind & Ponack

ATTORNEYS

INVENTORS
HIROSHI IZUMI
TOSHIAKI KATAHIRA
MICHIO FURUHASHI
BY Wenderoth, Lind & Ponack
ATTORNEYS

METHOD FOR IMPROVING SHARPNESS OF TELEVISION IMAGES

Filed Aug. 5, 1966 5 Sheets-Sheet 3

INVENTORS
HIROSHI IZUMI
TOSHIAKI KATAHIRA
MICHIO FURUHASHI
BY Wenderoth, Lind & Ponack
ATTORNEYS INVENTORS
HIROSHI IZUMI
TOSHIAKI KATAHIRA
MICHIO FURUHASHI
BY Wenderoth, Lind and Ponack
ATTORNEYS INVENTORS
HIROSHI IZUMI
TOSHIAKI KATAHIRA
MICHIO FURUHASHI
BY Wenderoth, Lind and Ponack
ATTORNEYS United States Patent Office 3,472,950
Patented Oct. 14, 1969

3,472,950

METHOD FOR IMPROVING SHARPNESS OF TELEVISION IMAGES

Hiroshi Izumi, Toshiaki Katahira, and Michio Furuhashi, Osaka-fu, Japan, assignors to Matsushita Electric Industrial Co., Ltd., Osaka, Japan Filed Aug. 5, 1966, Ser. No. 570,548
Claims priority, application Japan, Aug. 7, 1965, 40/47,849, 40/47,850
Int. Cl. H04n 5/76
U.S. Cl. 178—6.6 10 Claims

ABSTRACT OF THE DISCLOSURE

A method and a circuit for increasing the sharpness of an image while reproducing a TV picture. A zero crossing point pulse train is derived from a frequency modulated television signal, and image sharpening pulses are interpolated at certain points of the signal and added to the zero crossing point pulse train. The resultant signal is then demodulated and filtered. This sharpens the images by increasing the voltage of the signal more sharply.

This invention relates to a video tape recorder employing frequency modulation and more particularly to a method for improving the picture quality of television images which are recorded and reproduced with narrow band television signals due to a low relative speed of a magnetic head and a magnetic tape in said video tape recorder.

At the present time there has been widely used a video tape recording method employing frequency modulation. Said method has various advantages among which are that an amplitude variation in the reproduced signal does not have an effect on the reproduced television images and that a stable television signal can be reproduced in a wide range of frequencies, from several c./s. to several mc./s. for using in broadcasting. However, it is necessary for reproducing television signals in such a wide range of frequencies that the recording wave length on the magnetic tape be several times larger than the recording limited wave length, depending on the relative speed of the magnetic head and the magnetic tape and on the air gap in the magnetic head. Accordingly, the relative speed is required to be higher than 1200''/s. (approximately 30 m./s.). This requirement results in a high cost, a short life due to the wearing of the magnetic head, and makes necessary the use of a high density magnetic tape which requires careful handling. These factors effectively prevent manufacture of a video tape recorder for home use.

The sharpness of edges and thin lines of images are reduced and the resolution is impaired when pictures are reproduced from television signals having narrow band signals due to low pass characteristics of a transmission system which has a limited transmission bandwidth when such television signals pass through a transmission system which compries a magnetic head and tape. In general, a high frequency component of such television signals is responsible for resolution and sharpness of edges and thin lines of images in such pictures. Therefore, superior pictures can be reproduced by a high relative speed which satisfactorily extends the characteristic of an electromagnetic transducer system consisting of a head and tape to a high frequency signal band.

On the other hand, it is possible to make lower an upper limit for a reproducing signal band in a video tape recorder employing frequency modulation when the rise time is improved and pictures are modified psychovisually from the standpoint that the high frequency component of a narrow band television signal is compensated with respect to the waveform. The improvement will permit a decrease in the relative speed of the head and tape and in the carrier frequency and will provide a video tape recorder which has a long life, can be made at low cost and which is easy to handle, which characteristics are desirable for a home use video tape recorder.

There have been known heretofore several methods for improving the quality of the reproduced narrow band television signal, i.e. a waveform compensation method for improving sharpness, and a method of compensating a high frequency component with respect to the frequency. The high frequency compensation method compensates for a lost high frequency by using a circuit having a differentiating characteristic and emphasizing the lost high frequency and produces a desirable effect when the narrow band television signal has an excellent signal to noise ratio. However, it is difficult to obtain this desirable effect with a signal having an inferior signal to noise ratio because the noise component is also emphasized.

The waveform compensation method is a more common method, and it improves the image quality by a crispening effect and rise time compensation of the waveform, and is accomplished in various manners by using a first derivative, a second derivative or an open ended electromagnetic delay line.

In the first derivative method a narrow band television signal is differentiated and is successively admixed with an original signal which has been delayed by being passed through a spike producer. A signal having an inferior signal to noise ratio cannot produce desirable pictures because the first derivative circuit comprises a differentiating network and emphasizes the noise of a high frequency component.

The second derivative method provides a further crispening effect in addition to the first derivative effect and produces an effect which cannot be obtained by the first derivative method with respect to thin lines of pictures. However, a signal having an inferior signal to noise ratio results in poor pictures because the signal is differentiated twice in the second derivative method.

The open ended electromagnetic delay line method uses simpler components and operates in a similar way to that of the second derivative method but has a disadvantage that the delay time is required to be adjusted depending upon the signal band width of the narrow band signal and that a signal having an inferior signal to noise ratio produces poor pictures because of the differentiating characteristics similar to the second derivative method.

Television pictures prepared by a video tape recorder using frequency modulation are apt to have the resolution and sharpness impaired because of the narrow band television signal caused by the low relative speed of the magnetic head and the magnetic tape.

It is an object of this invention to provide a new method for improving the rise time of a television signal waveform for sharpening the edges and thin lines of pictures reproduced from such a signal.

It is a further object of this invention to provide means for producing a crispening effect in addition to an improvement in the rise time of a television siganl for a video tape recorder.

It is another object of this invention to provide means for producing pictures having the same sharpness as conventional television pictures by employing a narrow band television signal caused by lowering the relative speed of a magnetic head and a magnetic tape in a video tape recorder using frequency modulation so that a home use video tape recorder can be manufactured at a low cost.

These and other objects of this invention will become apparent upon consideration of the following description taken together with accompanying drawings in which.

Before giving a detailed description of this invention, the theory on which the invention is based will be explained briefly. In a video tape recorder using frequency modulation, predictive interpolation points are determined with respect to zero crossing point intervals of modulated television signals, which interpolation points are each at a half interval of the directly preceding zero crossing point interval, and an image sharpening signal is interpolated at these points. Then the modulated signals composed of zero crossing point pulses and pulses interpolated at the predictive interpolation point are demodulated to amplitude signals, and the sharpness of images reproduced therefrom are improved by a prediction error due to the transient variation in the amplitude of the television signals.

Figure 1:
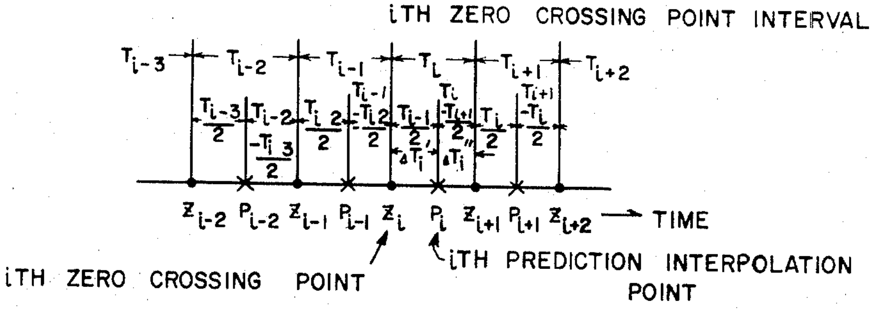
FIG. 1 is a graph illustrating predictive interpolation points according to the invention.

According to the invention, reproduction of a picture from a tape by a video tape recorder employing frequency modulation is effected in such a way that a reproduced modulation signal passes through a reproducing amplifier, a limiter circuit and a zero crossing point detection circuit and is transformed into a zero crossing point pulse train in which predictive interpolation points are determined so as to be in accordance with the following equations:

$$\Delta T'_i=\tfrac{1}{2}(Z_i-Z_{i-1})=\tfrac{1}{2}T_{i-1} \qquad (1)$$

$$\Delta T''_i=(Z_{i+1}-Z_i)-\Delta T'_i =T_i-\Delta T'_i=T_i-\tfrac{1}{2}T_{i-1} \qquad (2)$$

$$T_i=(Z_{i+1}-Z_i)=\Delta T'_i+\Delta T''_i \qquad (3)$$

$$P_i=Z_i+\Delta T'_i \qquad (4)$$

where:

$Z_i$=$i$th zero crossing point time
$T_i$=zero crossing point interval between $i$th and $(i+1)$th zero crossing point
$\Delta T'_i$=zero crossing point interval between the next predictive interpolation point $P_i$ after $Z_i$ and the time $Z_i$
$\Delta T''_i$=zero crossing point interval between the time $Z_{i+1}$ and the predictive interpolation point $P_i$
$i$=positive integer Referring to FIG. 1 which shows predictive interpolation points interpolated according to the Equations 1, 2, 3 and 4, a zero crossing point interval $\Delta T_i$ between an interpolated predictive interpolation point $P_i$ and a zero crossing point $Z_i$ of a modulated signal is a half of the directly preceding zero crossing interval $T_i$.

Figure 2:
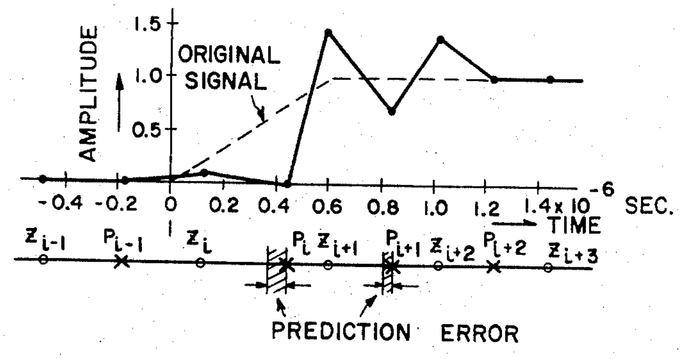
FIG. 2 is a graph illustrating demodulation signals which are added at predictive interpolation points shown in FIG. 1.

Frequency modulated reproducing signals which are demodulated are transformed into signals with amplitudes proportional to zero crossing point intervals of the frequency modulated signals, and then the carrier frequency is eliminated by a low pass filter. According to the invention, image sharpening signals are interpolated at predictive interpolation points which correspond to the center point of the zero crossing point intervals for a television signal level of constant amplitude so that a correction is effective and the demodulated signal has the same level as the television signal level of constant amplitude. In connection with edges and thin lines of pictures, a zero crossing point interval of a modulated signal varies transiently with the amplitude of the input waveform so as to result in incorrect prediction of a predictive interpolation point and resulting prediction errors, as shown in FIG. 2. When the pulse train is transformed into a saw-tooth waveform having an amplitude proportional to the pulse interval so as to make an envelope of said saw-tooth waveform, there appears an overshoot of the amplitude level at a zero crossing point interval having a prediction error, which overshoot is shown by a solid line in FIG. 2 wherein the dotted line is the original signal. The overshoot indicates a crispening effect and an improvement of the rise time which improves the image quality.

For better understanding the improvement of television images reproduced from narrow band signals according to the invention, the demodulated signals having image sharpening signals added at predictive interpolation points are compared with the demodulated signals having no such signals added at predictive interpolation points.

Figure 3:
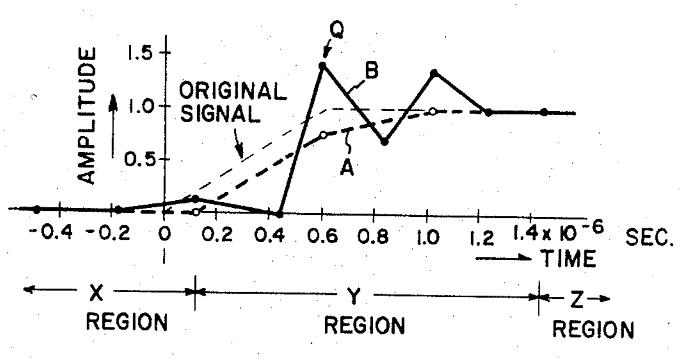
FIG. 3 is a graph illustrating demodulation signals shown in FIG. 2 in comparison with demodulation signals having no predictive interpolation points.

Referring to FIG. 3, the curve A indicates the waveform of demodulated signals which are demodulated and developed with no image sharpening signals added at predictive interpolation points and the curve B indicates the waveform of demodulated signals to which an image sharpening signal has been added at predictive interpolation points. There exists a correct prediction region where the signal has a constant amplitude level in regions X and Z. The signal level varies transiently at the edges and thin lines of the picture in the region Y. When image sharpening pulses are added at prediction interpolation points in the zero crossing point pulse train, there appears in the region Y a prediction error which results in an overshoot at a point Q. It will be readily understood from a comparison of curve A with curve B that the rise time of the curve B is improved more extensively than that of the curve A. The overshoot at the point Q indicates a crispening effect and produces pictures having excellent sharpness.

It is another advantage of adding an image sharpening signal at the predictive interpolation points that the cut-off characteristics of the low pass filter for eliminating the carrier frequency during demodulation extend to a modulation signal frequency that is about two times as high as the original modulation signal frequency, and this facilitates easy separation of the signal frequency from the carrier frequency.

Figure 4:
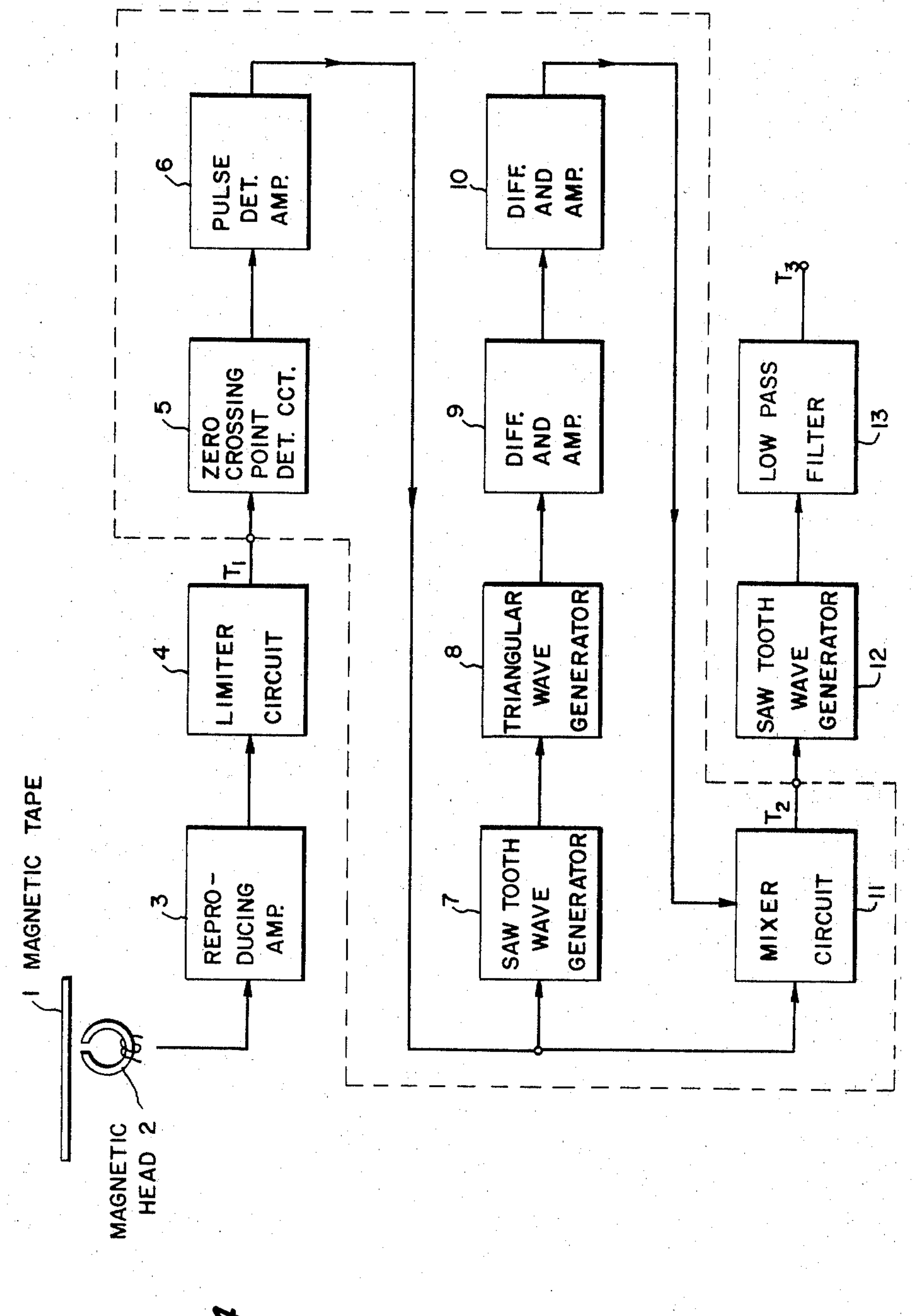
FIG. 4 is a block diagram of a system for reproducing television signals, wherein the part surrounded by a dotted line indicates the new circuit arrangement in accordance with the present invention.
Figure 5:
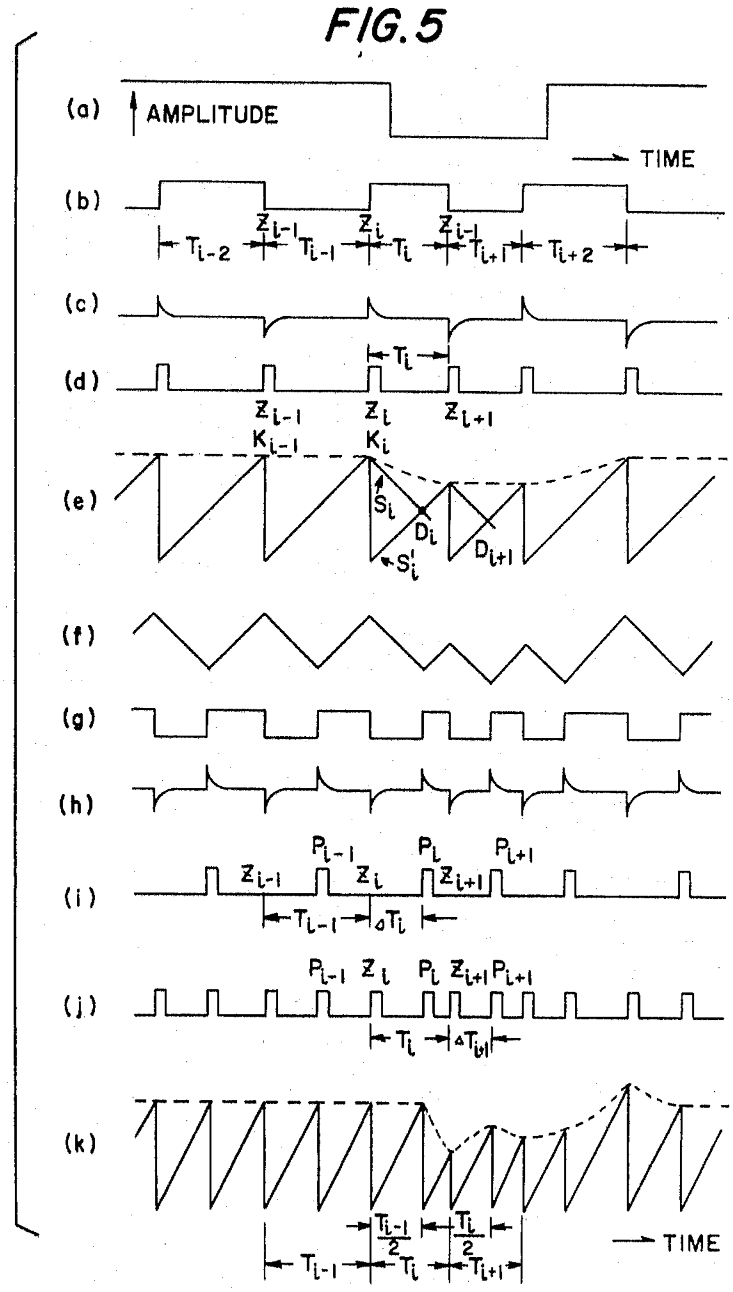
FIG. 5 is a graph illustrating the various waveforms which are obtained by various parts shown in the block diagram of FIG. 4.

A specific embodiment of the invention will be illustrated in FIGS. 4 and 5, but this should not be construed as limitative.

Referring to FIG. 4 in which the parts are designated by numbers and FIG. 5 wherein the waveforms are designated by letters, a (such as for a thin line of a TV picture) television signal *a* is caused to modulate a carrier frequency so that it has a rectangular waveform *b* having a zero crossing interval $T_i$ between zero crossing point $Z_i$ and $Z_{i+1}'$, and the frequency modulated signal is recorded magnetically on a magnetic tape 1. A frequency modulated signal reproduced by a reproducing head 2 is amplified by a reproducing amplifier 3, and then passes through a limiter circuit 4 so that the amplifier signal is shaped to a rectangular waveform similar to the waveform *b*.

According to a conventional demodulation method, a rising amplitude and a falling amplitude, i.e. a zero crossing point pulse can be in a pulse waveform *c*. A pulse waveform *d* can be obtained by making the pulses of waveform *c* all the same polarity, for example, a positive polarity. Pulse waveform *d* is transformed into an amplitude signal *e* by a saw-tooth wave generator 7, and then passes through a low pass filter 13 so as to be reproduced in an envelope shown by the dotted line in the waveform *e*. It will be apparent from the waveform *e* that the reproduced signal does not rise and fall sharply.

According to the present invention, a rectangular waveform modulated wave is passed through a limiter circuit 4 to a zero crossing point detection circuit 5 for detecting the points at which the wave rises and falls so as to generate a waveform *c*. A pulse detection amplifier 6 shapes and amplifies the waveform *c* to a pulse train *d* in which the pulses have the same polarity and are at zero crossing intervals $T_i$ exactly the same as that of the waveform *b*. The pulse train *d* triggers a saw-tooth wave generator circuit 7 and generates a saw-tooth wave having a superior linearity.

A triangular wave generator 8 forms a triangular waveform *f* from the waveform *e* in such a way that the amplitude of waveform *f* decreases from a maximum amplitude point $k_i$ of waveform *e* along a downward slope $S_i$ which has the same gradient as that of the upward slope $S'_i$ of said saw-tooth waveform, and the junction $D_i$ of said upward slope $S'_i$ and said downward slope $S_i$ and a junction $D_{i+1}$ which is produced in the same manner as the junction $D_i$ make a triangle $D_iK_{i+1}D_{i+1}$ the apex of which is a maximum amplitude point $K_{i+1}$. The triangular waveform *f* is differentiated and amplified to a rectangular waveform *g* by a differentiator and amplifier circuit 9. The rectangular waveform *g* is differentiated to a pulse train *h* by a differentiator and amplifier 10 which differentiates to produce a waveform *h* and then amplifies. The pulse train *i* is produced by removing the negative pulses of the pulse train *h* in a conventional way, for example a circuit comprising a diode circuit. In the pulse train *i*, a pulse $P_{i+1}$ exists at a predictive interpolation point which is at an interval $\Delta T'_{i+1}$ from the preceding zero crossing point $Z_{i+1}$ equal to a half of the directly preceding zero crossing interval $T_i$, because the triangular waveform *f* has the same gradient on the upward slope as on the falling slope. In such a way the pulse train *i* has prediction interpolation points which satisfy the previous Equations 1, 2 and 3 and has pulses at these points which are mixed with the pulse train *d*. When said downward slope $S_i$ of the saw-tooth waveform *e* has a gradient different from that of said upward slope $S'_i$, the pulse train *i* produced thereby can be adjusted by a delay line circuit.

The interpolation pulse train *i* thus generated is mixed with a zero crossing point pulse train *d* by a mixer circuit 11 so as to produce a pulse train *j*. The pulse interval of the train *j* can be demodulated into a waveform *k* by a saw-tooth wave generator circuit 12 and can be obtained in an envelope shown by a dotted line of the wave *k* at a terminal $T_3$ by a low pass filter 13.

Figure 7:
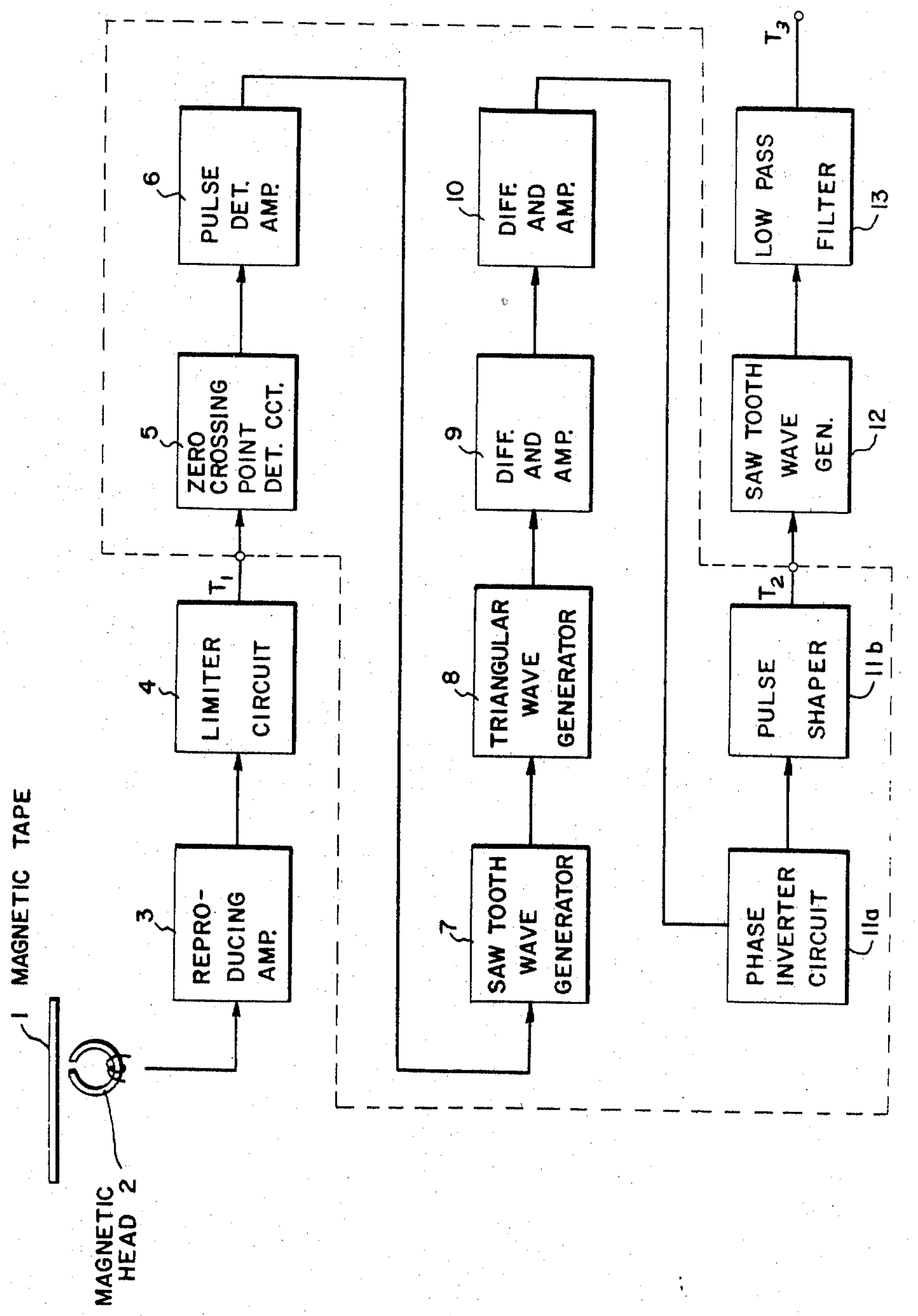
FIG. 7 is a block diagram similar to that of FIG. 4 for a modified circuit arrangement according to the invention.

It will be apparent from a comparison of the waveform *k* with the waveform *e* that the rise and fall thereof are improved by the addition of pulses at the predictive interpolation points. It should be noted that there is no need to mix the pulse train *d* with the pulse train *i* when the pulse train *h* is converted to a pulse train in which all of the pulses have the same polarity by changing the negative pulses of the pulse train *h* into positive pulses by means of a conventional phase invertor circuit. A circuit arrangement similar to that of FIG. 4 for carrying out this step is shown in FIG. 7 in which a phase invertor circuit **11*a* has been substituted for the mixer circuit 11**. The converted positive pulses and the positive pulses in the pulse train *h* can then be used to trigger a pulse shaper **11*b***.

Figure 6:
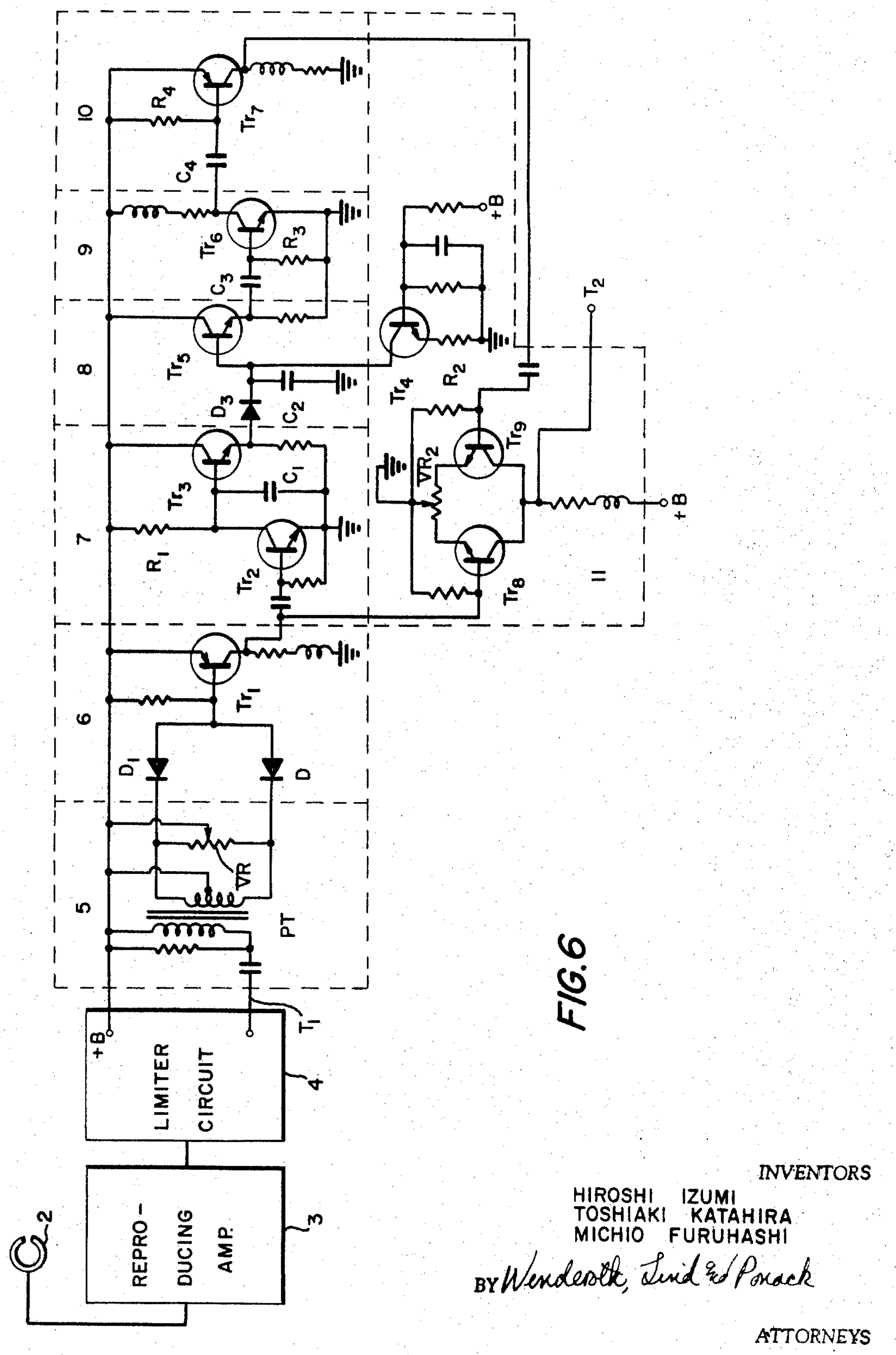
FIG. 6 is a circuit diagram for producing the various waveforms shown in FIG. 5.

The addition of the signals to the frequency modulated signal as described above can be carried out by a circuit shown in FIG. 6 wherein the same reference designate similar components to those of FIG. 4. The signal picked up from the tape by a conventional head 2 is conducted into a conventional amplifier 3, the details of which are not shown, and the output of the amplifier is conducted into a conventional limiter circuit 4, the details of which are likewise not shown. The output of the limiter circuit is conducted to the terminal $T_i$ of a zero crossing point detector, which comprises a pulse transformer PT, having a resistance connected across one side thereof and having the terminal $T_1$ connected to said one side. The other side of the pulse transformer has a connection between mid-point of the coil thereof and the +B line, and has a variable resistor $VR_1$ connected thereacross, the movable contact of which is also connected to the +B line.

The pulse detecting amplifier has two diodes $D_1$, and $D_2$ connected to the output from the pulse transformer PT, and the output sides of the diodes are connected to the case of a pnp transistor $Tr_1$, the emitter of which is connected to the +B line and the collecter of which is the output of the pulse detecting amplifier. The collector is also connected to ground through a resistance and inductance.

The saw-tooth wave generator 7 comprises an npn transistor $Tr_2$ to which the output from the pulse detecting amplifier is connected through a capacitor, which transistor has the collector connected to the +B line through a resistance $R_1$ and has the emitter connected to ground. A capacitor $C_1$ is also connected across the base and emitter of an npn transistor $Tr_3$, the connection including a resistor. The collector of transistor $Tr_3$ is connected directly to the +B line, and the output of the saw-tooth wave generator is taken from the emitter of the transistor $Tr_3$.

The triangular wave generator comprises a diode $D_3$ through which the output of the saw-tooth generator 7 passes and a grounded capacitor $C_2$ connected to the base of an npn transistor $Tr_5$ the collector of which is connected directly to the +B line and the emitter of which forms the output of the triangular wave generator. A constant current circuit is connected to the base of the transistor $Tr_5$, and comprises an npn transistor $Tr_4$ having the base connected to the +B line, and having the collector connected to the base of the transistor $Tr_5$. A grounded series resistance $R_2$ and a parallel connected resistance and capacitance are connected in series across the base and emitter of transistor $Tr_4$.

The differentiating and amplifying circuit 9 has a capacitor $C_3$ through which the output of the triangular wave generator 8 is fed to the base of an npn transistor $Tr_6$ having the resistor $R_3$ connected in a grounded circuit across the base and emitter thereof, and having the collector connected to the +B line through a resistance and an inductance. The output of the differentiating and amplifying circuit 9 is taken from the collector of the transistor $Tr_6$.

The differentiating and amplifying circuit 10 has a capacitor $C_4$ through which the output of the differentiating circuit 9 is fed to the base of a pnp transistor $Tr_7$ having the emitter connected directly to the +B line and having the collector grounded through an inductance and a resistance, the output being taken from the collector.

The mixer circuit 11 comprises two npn transistors $Tr_8$ and $Tr_9$, the output of the pulse detecting amplifier being connected to the base of the transistor $Tr_8$ and the output of the differentiating and amplifying circuit 10 being connected to the base of the transistor $Tr_9$ through a capacitor. The emitters of the transistors are connected to a common variable resistor $VR_2$, the movable contact of which is connected in a grounded circuit to the respective bases of the transistors through resistances in said grounded circuit. The collectors of the two transistors are connected to a common line to the +B line through a series connected resistance and inductance, and the output to terminal $T_2$ is taken from the two collectors.

Referring to FIGS. 6 and 7, a frequency modulated signal reproduced by the reproducing head 2 is amplified by the amplifier 3, and passes through a limiter 4 so as to be shaped to a rectangular waveform similar to the waveform *b*. The rectangular signal enters the terminal $T_1$ and is differentiated so that rising and falling amplitudes are detected (i.e. zero crossing points). The thus derived waveform *c* and the reverse waveform are transmitted to diodes $D_1$ and $D_2$ respectively by the pulse transformer PT. Finally, a waveform *d* is obtained by the detection amplifier 6 having diodes $D_1$ and $D_2$ and the transistor $Tr_1$. The pulse actuates the transistor $Tr_2$ so that it is conductive and actuates the capacitor $C_1$ to discharge electric energy stored therein so that a sawtooth wave *e* passes through the emitter follower $Tr_3$.

The capacitor $C_2$ is charged by the sawtooth wave *e* through the diode $D_3$ until the sawtooth wave reaches its maximum amplitude. The resistance of the diode $D_3$ in a forward direction is so small that the gradient is nearly equal to that of the sawtooth wave. When the capacitor $C_2$ is discharged through the resistor $R_2$ along the same time-voltage slope as during charging, the resistance of the diode $D_3$ in the reverse direction can be considered as infinite because of the reverse potential applied thereto. In such a way the holding voltage of the capacitor $C_2$ becomes equal to the voltage of the following saw-tooth wave generated in the capacitor $C_1$ so as to charge the capacitor $C_2$ and to generate a triangular wave *f*. After the triangular wave *f* passes through the emitter follower $Tr_5$, it is differentiated by the differentiating circuit $C_3R_3$ and is amplified by the transistor $Tr_6$ so as to produce a rectangular waveform *g*. It should be noted that the discharge current of the capacitor $C_2$ is kept constant by a constant current circuit comprising the transistor $Tr_4$ in order to make a slope of the trinagular wave *f* as close to linear as possible.

The rectangular waveform *g* is differentiated by the differentiating circuit $C_4R_4$ so as to produce a pulse waveform *h*. The pulses having a negative polarity are amplified by the transistor $Tr_7$ so as to produce a pulse train *i*, which is an auxiliary signal. The pulse train *i* and the input pulse wave for the transistor $Tr_1$, i.e. the pulse wave *d*, are supplied to the mixer circuit comprising the transistors $Tr_8$ and $Tr_9$, and a signal *j* is obtained at the terminal $T_2$ by adjusting the amplification factor through a volume control $VR_2$.

The signal *j* is thus obtained by interpolating image sharpening pulses between zero crossing points at an interval of half of the directly preceding crossing point interval. The pulses of signal *j* trigger the saw-tooth wave generator 12 and generate a saw-tooth wave *k* having an envelope with and amplitude signal shown by the dotted line in order to demodulate the pulse interval to an amplitude signal. The amplitude signal provides a reproduced television signal in an envelope shown by the dotted line in the waveform *k*, after it is passed through a low pass filter 13.

While the invention has been particularly shown and described with reference to a preferred embodiment thereof, it will be understood by those skilled in the art that various changes in form and details may be made therein without departing from the spirit and scope of the invention.

What is claimed is:

1. A method of increasing the sharpeness of an image while reproducing a TV picture, comprising deriving a zero crossing point pulse train from a frequency modulated television signal, interpolating image sharpening pulses at predictive interpolation points determined with respect to zero crossing point intervals of said frequency modulated television signal and adding said image sharpening pulses to said zero crossing point pulse train and thereafter demodulating the pulse train and filtering it for obtaining a television signal which will produce a sharpened image.

2. 2. A method as claimed in claim 1 in which the steps of interpolating the image sharpening pulses comprises generating a saw-tooth waveform having an amplitude proportional to the zero crossing point intervals of a frequency modulated television signal, decreasing said amplitude from a maximum amplitude point of a saw-tooth wave of said saw-tooth waveform along a downward slope to provide a triangular waveform consisting of a maximum amplitude point and a lower junction of said downward slope and the upward slope of the next saw-tooth wave in said saw-tooth waveform, differentiating said triangular waveform so as to produce a pulse which corresponds to said lower junction and is at the predictive interpolation point, and then mixing the said pulse with a pulse of said zero crossing point, and when the gradient of said downward slope is different from the gradient of the upward slope of the saw-tooth waveform, delaying the thus produced pulse.

3. A method as claimed in claim 1, wherein said image sharpening pulses are interpolated at predictive interpolation points which are positioned adjacent the center of the interval between succesive zero crossing points of a frequency modulated television signal.

4. A method as claimed in claim 1, wherein said image sharpening pulsés are interpolated at predictive interpolation points positioned at a predictive interpolation-point-interval which is subsequent to a zero crossing point by half of the interval between said zero crossing point and the zero crossing point immediately preceding said zero crossing point of a frequency modulated television signal.

5. A method as claimed in claim 1 in which the step of interpolating the image sharpening pulses comprises generating a saw-tooth waveform having an amplitude proportional to the zero crossing point intervals of a frequency modulated television signal, decreasing said amplitude from a maximum amplitude point of a saw-tooth wave of said saw-tooth waveform along with a downward slope having the same gradient as the upward slopes of said saw-tooth waveform to provide a triangular waveform consisting of a maximum amplitude point and a lower junction of said downward slope and the upward slope of the next saw-tooth wave in said saw-tooth waveform, differentiating said triangular waveform so as to produce a pulse which corresponds to said lower junction and is at the predictive interpolation point, and mixing said pulse with a pulse of said zero crossing point.

6. A method as claimed in claim 1 in which the step of interpolating the image sharpening pulses comprises generating a saw-tooth waveform having an amplitude proportional to the zero crossing point intervals of a frequency modulated television signal, decreasing said amplitude from a maximum amplitude point of a saw-tooth wave of said saw-tooth waveform along with a downward slope having the same gradient as the upward slopes of said saw-tooth waveform, to provide a triangular waveform consisting of a maximum amplitude point and a lower junction of said downward slope and the upward slope of the next saw-tooth wave in said saw-tooth waveform, differentiating said triangular waveform so as to produce a pulse train having pulses which correspond to said maximum amplitude point and said lower junction, and changing said pulses so that they all have the same polarity, said pulses being at zero crossing points and predictive interpolation points.

7. A circuit for reproducing a television picture from a frequency modulated television signal and for sharpening the image in the picture, comprising a reproducing amplifier circuit for amplifying the television signal, a limiter circuit coupled to the output of said amplifier circuit, a zero crossing point detecting circuit coupled to the output of said limiter circuit, a pulse detecting amplifier coupled to the output of said zero crossing point detecting circuit, circuit means coupled to the output of said pulse detecting amplifier for producing a train of image sharpening pulses at predictive interpolation points between the zero crossing points of said television signal, and means coupled to said pulse producing means for producing a train of pulses comprising said pulses at said zero crossing points and said image sharpening pulses, a saw-tooth wave generator coupled to the output of said last mentioned means for producing a saw-tooth waveform modulated according to said train of zero crossing point pulses and image sharpening pulses, and a low pass filter coupled to the output of said saw-tooth waveform generator.

8. A circuit as claimed in claim 7 in which said circuit means coupled to the output of said pulse detecting amplifier comprise a further saw-tooth wave generator for generating a saw-tooth waveform modulated according to the pulses detected in said pulse detecting amplifier, a triangular wave generator coupled to the output of said further saw-tooth wave generator for producing a triangular waveform having lower junctions at said predictive interpolation points, a first differentiating and amplifying circuit coupled to the output of said triangular wave generator, and a second differentiating and amplifying circuit coupled to the output of said first differentiating and amplifying circuit, said differentiating and amplifying circuits producing a train of pulses containing image sharpening pulses at said interpolating points, and said means for producing a train of pulses comprises a mixing circuit coupled to the output of said pulse detecting amplifier and to the output of said second differentiating and amplifying circuit for mixing the zero crossing point pulses and the image sharpening pulses.

9. A circuit as claimed in claim 7 in which said circuit means coupled to the output of said pulse detecting amplifier comprise a further saw-tooth wave generator for generating a saw-tooth waveform modulated according to the pulses detected in said pulse detecting amplifier, a triangular wave generator coupled to the output of said further saw-tooth wave generator for producing a triangular waveform having lower junctions at said predictive interpolation points, a first differentiating and amplifying circuit coupled to the output of said triangular wave generator, and a second differentiating and amplifying circuit coupled to the output of said first differentiating and amplifying circuit, said differentiating and amplifying circuits producing a train of pulses containing image sharpening pulses at said interpolation points, and said means for producing a train of pulses comprises a phase inverter circuit coupled to the output of said second differentiating and amplifying circuit for inverting the phase of the zero crossing point pulses in the train of pulses produced by said differentiating and amplifying circuits.

10. A circuit as claimed in claim 7 and further comprising a time delay circuit coupled between said circuit means for producing a train of image sharpening pulses and said means for producing a train of zero crossing point pulses and image sharpening pulses.

References Cited

UNITED STATES PATENTS

| | | | |
|---|---|---|---|
| 2,851,522 | 9/1958 | Hollywood | 178—6 |
| 2,510,070 | 6/1950 | Cawein | 178—6.8 |
| 3,363,187 | 1/1968 | Hickin | 328—108 |

OTHER REFERENCES

"High-Density Recording on Magnetic Tape," Oct. 16, 1959, Electronics, by Andrew Gabor (pp. 72–75).

ROBERT L. GRIFFIN, Primary Examiner

D. E. STOUT, Assistant Examiner

U.S. Cl. X.R.

178—7.5; 329—110